United States Patent [19]
Perrington et al.

[11] Patent Number: 5,079,068
[45] Date of Patent: Jan. 7, 1992

[54] ADHESIVELY EDGE-PADDING A STACK OF COLLATED CARBONLESS PAPER

[75] Inventors: Kenneth J. Perrington, Woodbury; Clair J. Emery, Maplewood, both of Minn.

[73] Assignee: Minnesota Mining and Manufacturing Company, St. Paul, Minn.

[21] Appl. No.: 306,327

[22] Filed: Feb. 7, 1989

[51] Int. Cl.$^5$ .......................... B32B 23/02; C09J 5/00
[52] U.S. Cl. .................... 428/192; 156/305; 156/327; 156/331.8; 281/21.1; 412/6; 412/8; 524/543; 524/555; 462/55
[58] Field of Search ............ 156/305, 327, 331.8; 524/543, 555; 412/6, 8; 282/22 R, 24 R; 281/21.1; 428/192

[56] References Cited

U.S. PATENT DOCUMENTS

| | | |
|---|---|---|
| 3,860,549 | 1/1975 | Sekmakas .......................... 524/555 |
| 3,960,638 | 6/1976 | Ogata et al. . |
| 3,963,553 | 6/1976 | Kiritani et al. . |
| 3,970,500 | 7/1976 | Ishizuka et al. . |
| 3,970,501 | 7/1976 | Miyamota et al. . |
| 4,041,193 | 8/1977 | Hayashi et al. . |
| 4,105,611 | 8/1978 | Orth, Jr. . |
| 4,217,162 | 8/1980 | Glanz et al. . |
| 4,283,317 | 11/1981 | Murphy et al. . |
| 4,345,349 | 8/1982 | Flanagan . |
| 4,413,080 | 11/1983 | Blake . |
| 4,497,941 | 2/1985 | Aliani et al. . |

FOREIGN PATENT DOCUMENTS 1592358 7/1981 United Kingdom .
2167074 10/1985 United Kingdom .

Primary Examiner—John J. Gallagher
Attorney, Agent, or Firm—Gary L. Griswold; Walter N. Kirn; Dale A. Bjorkman

[57] ABSTRACT

Known adhesive compositions for edge-padding a stack of sets of collated sheets of carbonless copy paper have not provided both good fanout and good adhesion within individual sets unless used with carbonless copy paper from the company that supplies the adhesive. This problem is here resolved by using a water-based adhesive composition that differs from those in current use simply by adjusting the amount and type of monohydric and polyhydric alcohol. Best results are attained when the polyhydric alcohol is noncrystalline sorbitol.

12 Claims, 1 Drawing Sheet

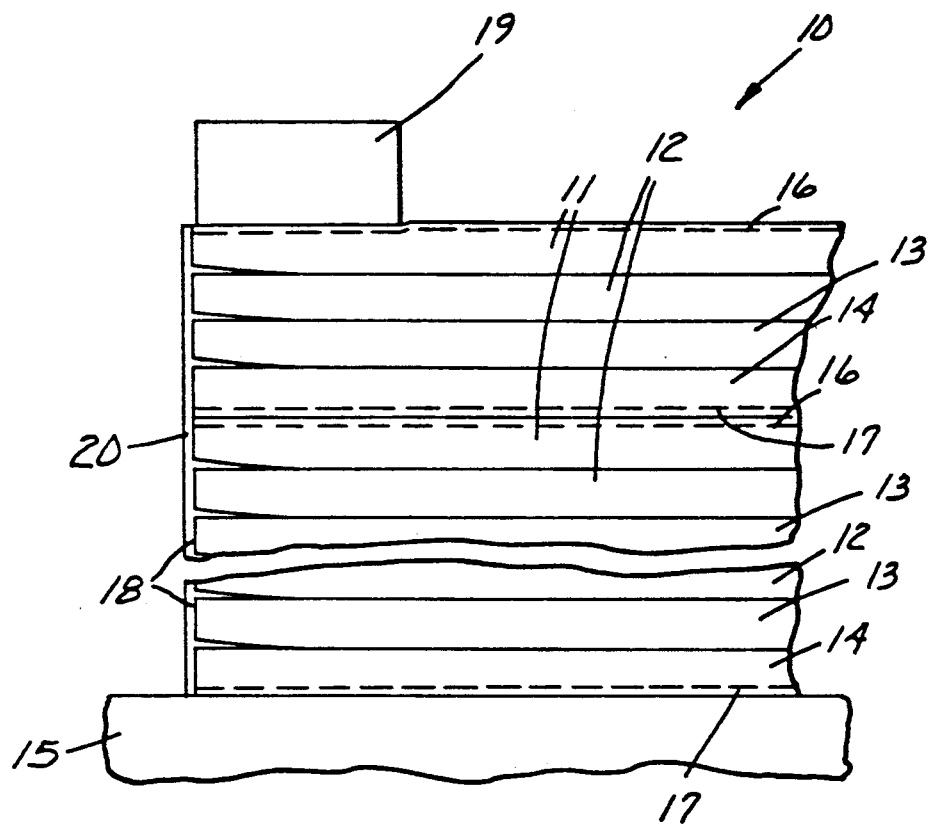

ADHESIVELY EDGE-PADDING A STACK OF COLLATED CARBONLESS PAPER

BACKGROUND OF THE INVENTION

1. Field of the Invention

The invention particularly concerns the use of a water-based adhesive for adhesively edge-padding a stack of collated paper, especially carbonless paper, so that upon being fanned out, the stack spontaneously separates into individual sets, each set being adhesively bonded together at one edge.

2. Description of the Related Art

U.S. Pat No. 4,217,162 (Glanz et al.) says: "For many years carbonless copy paper has been made into form sets from a lift of collated sheets by applying an adhesive to one edge of the lift, drying the padded edge and fanning the lift into individual form sets. British Pat. No. 1,263,510 discloses an improvement in edge-padding performance by using as the adhesive a mixture of an aqueous solution of a gelatin derivative and an aqueous emulsion of a polymer. Further improvements in edge-padding are taught in U.S. Pat. Nos. 3,960,638; 3,963,553; 3,970,500; 3,970,501; and 4,041,193 where a naphthalene sulfonic acid-formaldehyde condensate is used in an edge-padding adhesive formulation in various combinations with materials such as water-soluble polymers, water-soluble binders, water-soluble metal salts, polymer emulsions, surface active agents and latexes. Japanese Pat. Publication Nos. 12844/1978 [JP 78012844] and 12845/1978 [JP 78012845] teach the use of a surface active agent with an aqueous solution of a synthetic polymeric adhesive, respectively, in an edge-padding adhesive formulation. Japanese Pat. Disclosure No. 99635/1974 [JP 49099635] teaches an aqueous edge-padding adhesive composition comprising a vinyl acetate/maleic acid copolymer and various alcohols" (col. 1, lines 19-43).

Like the adhesive compositions mentioned in the foregoing quotation, that of the Glanz patent is a water-based adhesive but is said to provide better bonding within a set and better separation between sets when the edge of the lift or stack is pretreated with water or certain aqueous solutions before applying the adhesive. The Glanz patent says: "Selective adherence occurs because the adhesive bonds the coated surfaces of the collated form, but not the uncoated surfaces" (col. 2, lines 29-31). Except for that statement, neither the Glanz patent nor any of the above-cited patents or publications explains why the adhesive adheres only to the coated surfaces.

Chem Abstracts, Vol. 99, Abstract 185057J (1983) reports that Japanese Pat. Application 81/160,004 [JP 81160004] (Fuchigami; also PCT Int. Application WO 83 01,228) uses an aqueous latex adhesive to bond the edge of a stack of carbonless or no-carbon-required (ncr) paper that can be fanned apart into individual sets. The abstract says that "the outside surfaces of the copying paper set are coated with water resistant and/or water repellent substances to prevent adhesion between sets."

In collated carbonless copy papers currently on the market, at least one of the outer faces of each set typically has been treated with a silicone, fluorocarbon or some other coating which counteracts curling that otherwise would result from the functional coating on the other surface of that sheet. That treatment also acts as a release agent for the edge-padding adhesive and can allow the adhesively edge-padded stack to separate into sets upon fanning, assuming that the edge-padding adhesive is not so thick as to create bridges that would inhibit such separation. Failures to separate are quite common.

Several adhesive compositions are currently marketed specifically for the purpose of edge-padding collated stacks of carbonless copy paper to be fanned into sets. Of these, the following are predominant in the U.S. market: "Mead Fan-Apart Adhesive" from the Fine Paper Division of Mead Paper Corp., Chillicothe, OH; "Fanapart High-strength Padding Adhesive" from Appleton Papers, Inc., Appleton, WI; and "Fan-Out Padding Adhesive" from 3M. Each of these is a water-based adhesive composition. Unfortunately, each of these adhesive compositions is specifically formulated for use with carbonless copy paper marketed by the same company, and is not satisfactory for use with carbonless copy paper of another company. When so used, the adhesively edge-padded stack may either fail to fan apart or individual sheets within the sets may separate prematurely, e.g. when subjected to crash-imprinting.

It is believed that the carbonless copy paper marketed by each of these three companies has a fluorocarbon coating on at least one of the outer faces of each set, which coating acts as a release agent when an edge-padding adhesive is applied.

The aforementioned dominant edge-padding adhesive compositions have been analyzed and are believed to have the following approximate compositions:

|  | % by wt. |
|---|---|
| "Mead Fan-Apart Adhesive" | |
| poly(ethylacrylate/methylacrylate) (92/8) | 13 |
| 1,2-propanediol | 19 |
| ethyl alcohol | 7 |
| water | 61 |
| "Fanapart . . . " from Appleton | |
| poly(ethylacrylate/N-methylolacrylamide) | 17 |
| 1,2-propanediol | 28 |
| ethyl alcohol | 8 |
| water | 47 |
| "Fan-Out Padding Adhesive" from 3M | |
| poly(ethylene/vinyl acetate) stabilized with surfactant | 9 |
| poly(vinyl alcohol) | 4.5 |
| ethyl alcohol | 28 |
| crystalline sorbitol, 4000 NF | 1.25 |
| water | 57.25 |

In each of these adhesive compositions, the first-named ingredient is a water-based latex adhesive polymer. The monohydric alcohol increases the rate of penetration and enhances drying. Each of the polyhydric alcohols, including sorbitol, has a Hansen dispersion solubility parameter close to that of the polymer and thus may serve to plasticize the edge-padding adhesive. The poly(vinyl alcohol) of the 3M adhesive is a low molecular weight, water soluble, polymeric, polyhydric alcohol and may also act as a viscosity control agent.

SUMMARY OF THE INVENTION

The invention concerns the use of a water-based edge-padding adhesive composition that differs from prior edge-padding adhesive compositions in its alcohol content. Simply by adjusting the amounts and type of monohydric and polyhydric alcohols, it is possible for the first time with just one water-based adhesive composition to edge-pad a stack of sets of collated sheets of carbonless copy paper from any of the aforementioned dominant suppliers with the confidence that the edge-padded stack can be readily fanned apart into sets which do not separate prematurely in use such as when subjected to crash-imprinting.

More specifically, the invention concerns a method of adhesively edge padding a stack of sets of collated sheets, at least one outer face of each set having a coating that serves as a release agent, which method includes the steps of (1) applying to an edge of the stack a water-based adhesive composition which comprises by weight:
  (a) from 7.5 to 20% (dry weight) of a water-based latex adhesive polymer,
  (b) from 2.5 to 12.5% of a noncrystallizing, low-molecular-weight, water-soluble polyhydric alcohol, and as little as 0.5% when the polyhydric alcohol is modified sorbitol,
  (c) from 12.5 to 27.5% of a low-molecular-weight, water-soluble, monohydric alcohol, and
  (d) from 40 to 75% of water, and (2) allowing the applied adhesive composition to dry.

It is surprising that simply by adjusting the alcohol content, specifically the amounts of monohydric and polyhydric alcohols, a water-based adhesive composition can provide both good fanout between sets and good adhesion within sets of collated carbonless copy paper, regardless of the source of that paper. Especially good results have been attained when the polyhydric alcohol is mostly modified sorbitol, preferably entirely modified sorbitol. (By "modified" is meant sorbitol treated to render it noncrystalline.)

The same water-based adhesive composition is also useful for adhesively edge-padding a stack of ordinary paper that has been collated into sets, at least one of the outer faces of each set being coated with a release agent.

Although release coatings on both outer faces of each set should better assure fanout, a single coating may be adequate and hence preferred because of lower cost. For example, a release coating may be omitted from the backside of the coated front (CF) sheet.

THE DRAWING

The invention may be more easily understood in reference to the drawing, the single FIGURE of which schematically indicates in cross section the edge padding of a stack of sets of collated sheets of carbonless copy paper by the method of the invention, which stack upon fanning separates into individual sets.

Shown in the drawing is a stack 10 of 4-part carbonless copy paper sheets including top sheets 11 (coated back=CB), intermediate sheets 12 and 13 (coated front and back=CFB), and bottom sheets 14 (coated front=CF) resting on a table 15. Each CB coating contains rupturable capsules which when ruptured release reagents to produce a color-changing reaction at the adjacent CF coating.

The outer, uncoated faces of the top sheet 11 and bottom sheet 14 of each 4-part set have been treated with release agent 16 and 17, respectively. A flat plate (not shown) can be used to afford a smooth edge 18 to the stack 10. While compressing the edge 18 with a steel bar 19, a water-based adhesive composition 20 has been applied to the edge and has flowed into the stack to produce an adhesively edge-padded stack of the invention.

DETAILED DISCLOSURE

A preferred water-emulsifible adhesive polymer is poly(ethylacrylate/N-methylolacrylamide). Other useful water-based latex adhesive polymers are poly(vinyl acetate), poly(styrene/butadiene), poly(vinylidene chloride/butadiene), poly(ethylacrylate/methylacrylate), and polyethylacrylate.

Because of differences between carbonless copy papers from the aforementioned suppliers, there is no single preferred amount of the water-based latex adhesive polymer in the water-based adhesive composition. However, for use with the carbonless copy paper of any of above-named suppliers, it is preferred to employ no more than about 20% by weight (dry basis) of the water-based latex adhesive polymer to ensure that the edge-padded stack separates into sets upon fanning. It also is preferred to employ at least 7.5% by weight of the water-based latex adhesive polymer to ensure adequate adhesion between individual sheets of the sets.

A preferred noncrystallizing, low-molecular-weight, water-soluble polyhydric alcohol is modified sorbitol. Noncrystallizing or modified forms of sorbitol are available as "Sorbo", "Sorbo Special", and "Arlex" from ICI Americas, Inc. Other useful noncrystallizing polyhydric alcohols include 1,2-propanediol; 1,4-butanediol; 1,5-pentanediol; pentaerythritol; 2,2-dimethyl-1,3-propanediol; 1,3-propanediol; 1,2,4-butanetriol; and glycerol.

At more than about 12.5% by weight of the polyhydric alcohol, there might be inadequate adhesion between individual sheets of sets of carbonless copy paper from one or two of the aforementioned suppliers. At less than 2.5% (or less than 0.5% when the polyhydric alcohol is modified sorbitol), it might be difficult to separate individual sheets of a set without delaminating the paper at the adhesive.

Ethyl alcohol is a preferred low-molecular-weight, water-soluble monohydric alcohol because it is such a good carrier for the adhesive polymer, is low in cost, has a less objectionable odor than do other monohydric alcohols, and is nontoxic. Other useful water-soluble monohydric alcohols include isopropyl alcohol and n-propyl alcohol. Methyl alcohol also meets the objectives of the invention but is not preferred because of its toxicity.

When a stack of carbonless copy paper is guillotined to provide a smooth edge to be adhesively edge-padded, materials released from the capsules may contaminate the edge to interfere with the formation of a good bond between the edge-padding adhesive and the edge. It has been found that when at least part of the monohydric alcohol is isopropanol, any such interference is minimized.

At more than about 27.5% by weight of the monohydric alcohol, the edge-padding adhesive composition might migrate too far into the stack and so fail to develop adequate adhesion between the sheets of individual sets of carbonless copy paper from one or two of the aforementioned suppliers. At less than about 7.5%, an adhesively edge-padded stack might fail to separate into sets upon fanning.

The above-described preferred ranges of amounts of monohydric and polyhydric alcohols allow for relatively greater amounts of the monohydric alcohol to evaporate when the container is opened, but care should be exercised not to allow the container to remain open for long periods of time, because this would change the amounts of solvent. In such event, later-applied edge-paddings might no longer provide both good fanout and good adhesion within sets of collated carbonless copy paper of each of the aforementioned dominant suppliers.

To provide complete assurance of adequate adhesion between individual sheets of each set in a collated stack, sufficient amounts of the novel water-based adhesive composition should be applied to the edge of the stack until excess adhesive composition runs down the edge of the stack. Greater amounts cause no problem except to be wasteful.

Carbonless copy paper is often collated into sets as follows:

For 2-part sets—
 First sheet: CB=coated back
 Second sheet: CF=coated front
For 3-part sets—
 First sheet: CB=coated back
 Second sheet: CFB=coated front and back
 Third sheet: CF=coated front
For 4-part sets—
 First sheet: CB=coated back
 Second sheet: CFB=coated front and back
 Third sheet: CFB=coated front and back
 Fourth sheet: CF=coated front Each CB coating contains rupturable capsules which when ruptured release reagents to produce a color-changing reaction at the adjacent CF coating.

In order to ensure that the edge of the stack remains uniform, the edge preferably is compressed by a weight during the edge-padding step. The amount of compression is not material as long as it is not so great as to rupture the reagent-containing capsules [(preferably not more than about 50 psi (340 kPa)]. When there are no capsules to rupture, there is no practical limit to the amount of compression.

It is more difficult to form a strong CB/CF bond in 2-part sets than it is to form CB/CFB and CFB/CF bonds between the individual sheets of 3-part sets. In 4-part or greater sets, it is more difficult to form strong CFB/CFB bonds than it is to form strong CB/CFB and CFB/CF bonds. Consequently, in 4-part or greater sets, CFB/CFB bonds are the bonds most likely to break upon fan-out or crash printing. The most stringent testing of the ability to form strong bonds between sheets is in 2-part sets (CB/CF) and in 4-part sets (CFB/CFB), rather than in 3-part sets.

The quality of an edge-padding adhesive composition can be determined by two tests, one showing how readily a stack of collated sheets separates into sets ("Fan-Out Rating") and the other showing the strength of the adhesive bond between individual sheets of a set ("Bond Strength").

Fan-Out Rating

A stack of sets of collated sheets that has been edge-padded is tested for fanout into sets as follows:

(1) While gripping the edge-padded end stack with one hand and the unpadded end with the other, bend the stack into a "U" shape. Then while holding the stack horizontally, release the padded end, allowing that end to droop downward. If complete fanout has been accomplished, rate as a 3.5; if not, continue.

(2) Place the stack on a flat surface with fingers one inch (2.5 cm.) back from the edge-padded end on top and thumbs under the corners, and simultaneously fan upwards on both corners of the edge padded end. If complete fanout has been accomplished, rate as 3.0; if not, continue.

(3) Place on a flat surface with fingers on top and the thumbs under the edge-padded end approximately 3 inches (7.6 cm) from the corners of the edge-padded end, and simultaneously fan upwards once. If complete fanout has been accomplished, rate as 2.5; if not, continue.

(4) Place stack on a flat surface with fingers on top and thumbs under the edge-padded end wherever needed, and simultaneously fan upwards twice. If complete fanout has been accomplished, rate as 2.0; if not, continue.

(5) While holding the stack as in step 4), fan with both thumbs three times wherever needed. If complete fanout has been accomplished, rate as 1.5; if not, continue.

(6) While holding the stack as in step 4), fan with the thumbs six more times wherever needed. If complete fanout is accomplished, rate as 1.0; if not continue.

(7) While holding the stack as in step 4) continue to fan with the thumbs wherever needed. If complete or partial fanout can be accomplished, rate as 0.5; if not, rate as 0.

Generally, the carbonless copy paper industry will accept a Fan-Out Rating of 2.0, but a higher value would be preferred.

Bond Strength

The strength of the adhesive bond between two individual sheets of a set of carbonless copy paper is tested using a tension measurement device. Two models of such a device are available from Chatillon, i.e., "Gauge-R" [maximum "Bond Strength", 45 units (10 pounds or 45 hectograms of force)]; and "Digital Force Gauge Model DFGRS50" [maximum "Bond Strength", 250 units]. With the unpadded end of one sheet in the clamp, the unpadded end of the other sheet is gripped by the thumb, fingers and palm of one hand and pulled slowly until the bond fails. In 4-part sets, measurements are made between the coated front sheet and a coated front and back sheet (CF/CFB), between two coated front and back sheets (CFB/CFB), and between a coated front and back sheet and the coated back sheet (CFB/CB). Typically, the lowest Chatillon "Bond Strength" in a 4-part set is CFB/CFB.

When the Chatillon "Bond Strength" exceeds 10 units (10 hectograms of force) across a width of 8.5 inches (21.6 cm), a set of the edge-bonded sheets should withstand premature separation in any ordinary printing operation, including crash printing or perforating.

In the following examples, all parts are by weight.

EXAMPLES 1, 2 and 3

Three edge-padding adhesive compositions were prepared using as the water-based adhesive polymer a copolymer of ethylacrylate and N-methylolacrylamide obtained as "Rhoplex" HA-24 from Rohm & Haas. Those adhesive compositions were:

| | % of weight Example | | |
|---|---|---|---|
| | 1 | 2 | 3 |
| water-based adhesive polymer (dry wgt) | 15 | 15 | 16 |
| 1,2-propanediol | 10 | 0 | 0 |
| noncrystallizing sorbitol ("Sorbo Special") | 0 | 1.6 | 1 |
| ethyl alcohol | 15 | 20 | 18 |

|  | % of weight Example | | |
|---|---|---|---|
|  | 1 | 2 | 3 |
| water | 60 | 63.4 | 65 |

The edge-padding adhesive compositions of Examples 1 and 2 were tested in comparison to the three currently dominant edge-padding adhesive compositions, the approximate compositions of which are set forth above under "Description of Related Art", namely:

| Comparative Adhesive | |
|---|---|
| A | "Mead Fan-Apart Adhesive" |
| B | "Fanapart High-Strength Padding Adhesive" from Appleton |
| C | "Fanout Padding Adhesive" from 3M |

Each of the edge-padding adhesive compositions was tested on 2-part and multi-part carbonless copy papers from each of the dominant suppliers.

In Table I, the adhesives of Examples 1 and 2 are compared to each of the Comparative Adhesives A, B and C on carbonless paper obtained from all three suppliers. In Table II, which reports testing of the adhesives of each of Examples 1, 2 and 3, the comparisons are limited to the adhesive of each dominant supplier on its own paper. The "Bond Strength" values reported in Table I were obtained using a Chatillon "Gauge-R", and those reported in Table II, using Chatillon Model DFGRS50.

TABLE I

| Expl. | 2-part sets | | 3-part sets | | |
|---|---|---|---|---|---|
|  | Bond Str. CB/CF | Fan-Out Rating | Bond Str. CB/CFB | CFB/CF | Fan-Out Rating |
| Mead Paper ("Trans-rite" blue image) | | | | | |
| 1 | 22 | 1.5 | 26 | 30 | 2.5 |
| 2 | 21 | 1.5 | 25 | 30 | 3.0 |
| A | 11 | 3.0 | 24 | 24 | 3.5 |
| B | 8 | 1.0 | 18 | 22 | 3.0 |
| C | 5 | 1.0 | 4 | 6 | 2.0 |
| Appleton Paper (black image) | | | | | |
| 1 | 15 | 3.5 | 30 | 37 | 3.5 |
| 2 | 16 | 3.5 | 32 | 30 | 3.5 |
| A | 0 | 3.5 | 21 | 23 | 3.5 |
| B | 5 | 3.5 | 21 | 27 | 3.5 |
| C | 6 | 3.5 | 35 | 35 | 3.5 |
| 3M Paper (blue/purple image) | | | | | |
| 1 | 29 | 2.5 | 45 | 45 | 3.0 |
| 2 | 34 | 3.0 | 47 | 48 | 3.5 |
| A | 0 | 3.5 | 4 | 1 | 3.0 |
| B | 16 | 3.5 | 29 | 34 | 3.0 |
| C | 18 | 3.5 | 38 | 44 | 3.0 |

TABLE II

| Expl. | 2-part sets | | 3-part sets | | | 4-part sets | | | |
|---|---|---|---|---|---|---|---|---|---|
|  | Bond Str. CB/CF | Fan-Out Rating | Bond Str. CB/CFB | CFB/CF | Fan-Out Rating | Bond Str. CB/CFB | CFB/CFB | CFB/CF | Fan-Out Rating |
| Mead Paper ("Trans-rite" blue image) | | | | | | | | | |
| 1 | 20 | 2.5 | 34 | 38 | 3.5 | 44 | 30 | 56 | 3.0 |
| 2 | 15 | 2.0 | 36 | 40 | 3.5 | 44 | 19 | 52 | 3.0 |
| 3 | 20 | 2.0 | 37 | 43 | 3.5 | 53 | 32 | 56 | 3.0 |
| A | 20 | 3.5 | 32 | 38 | 3.5 | 43 | 28 | 42 | 3.0 |
| Mead Paper ("Trans-rite" black image) | | | | | | | | | |
| 1 | 26 | 3.5 | 34 | 42 | 3.5 | 44 | 32 | 43 | 3.5 |
| 2 | 18 | 3.5 | 32 | 43 | 3.5 | 45 | 28 | 51 | 3.5 |
| 3 | 26 | 3.5 | 37 | 47 | 3.5 | 48 | 32 | 50 | 3.5 |
| A | 18 | 3.5 | 32 | 41 | 3.5 | 38 | 27 | 43 | 3.5 |
| Appleton Paper (regular black image) | | | | | | | | | |
| 1 | 26 | 3.5 | 51 | 56 | 3.5 | 45 | 28 | 50 | 3.5 |
| 2 | 25 | 3.5 | 47 | 53 | 3.5 | 45 | 25 | 48 | 3.5 |
| 3 | 34 | 3.5 | 48 | 55 | 3.5 | 52 | 29 | 50 | 3.5 |
| B | 16 | 3.5 | 39 | 40 | 3.5 | 32 | 23 | 38 | 3.5 |
| Appleton Paper ("Sprint" black image) | | | | | | | | | |
| 1 | 29 | 3.5 | 43 | 42 | 3.5 | 51 | 36 | 45 | 3.5 |
| 2 | 29 | 3.5 | 45 | 42 | 3.5 | 46 | 31 | 45 | 3.5 |
| 3 | 30 | 3.5 | 48 | 45 | 3.5 | 53 | 41 | 50 | 3.5 |
| B | 23 | 3.5 | 30 | 29 | 3.5 | 38 | 29 | 36 | 3.5 |
| 3M Paper (blue/purple image) | | | | | | | | | |
| 1 | 26 | 2.5 | 46 | 43 | 3.5 | 57 | 48 | 54 | 3.5 |
| 2 | 29 | 2.5 | 47 | 51 | 3.5 | 56 | 48 | 61 | 3.5 |
| 3 | 26 | 3.5 | 41 | 41 | 3.5 | 54 | 41 | 56 | 3.5 |
| C | 15 | 2.5 | 39 | 47 | 3.5 | 44 | 40 | 57 | 3.5 |
| 3M Paper (black image) | | | | | | | | | |
| 1 | 36 | 2.0 | 53 | 54 | 3.5 | 66 | 57 | 60 | 3.5 |
| 2 | 43 | 2.5 | 63 | 62 | 3.5 | 73 | 65 | 67 | 3.5 |
| 3 | 35 | 2.0 | 62 | 62 | 3.5 | 70 | 60 | 61 | 3.5 |
| C | 27 | 2.0 | 48 | 56 | 3.0 | 61 | 39 | 61 | 3.5 |

EXAMPLES 4–12

Nine edge-padding adhesive compositions were prepared that were identical to each other except having a different water-based latex adhesive polymer. Example 4 was a repeat of Example 1. Each composition included

|  | % by wt. |
|---|---|
| water-based adhesive polymer (dry wgt.) | 15 |
| 1,2-propanediol | 10 |
| ethyl alcohol | 15 |
| water | 60 | and its water-based adhesive polymer was

| Expl. | Water-based adhesive polymer | Trade name |
|---|---|---|
| 4 | poly(ethylacrylate/N-methylolacrylamide) | Rhoplex HA-24 |
| 5 | poly(ethylacrylate) | Rhoplex LC-40 |
| 6 | poly(ethylacrylate) | Rhoplex NW-1345 |
| 7 | poly(ethylacrylate) | Rhoplex E-940 |
| 8 | poly(vinylidene chloride/butadiene) | Dow DL-244A |
| 9 | poly(styrene/vinylidene chloride/butadiene/itaconic acid) | Dow DL-243A |
| 10 | poly(styrene/butadiene) | Dow DL-240A |
| 11 | poly(styrene/butadiene) | Dow DL-239A |
| 12 | poly(ethylene/vinyl acetate) | Airflex HS-100 |

Each of these nine edge-padding adhesive compositions was brushed by the same person onto the edge of a stack of 2-part sets of collated carbonless paper of one of the three aforementioned dominant suppliers. After drying, each stack was tested for "Fan-out Rating", and individual sets were tested for "Bond Strength" (CB/CF) using Chatillon "Gauge-R" except for Example 12 where the Model DFGRS50 was used. Results are reported in Table III.

TABLE III

| | 2-Part Carbonless Copy Paper from | | | | | |
|---|---|---|---|---|---|---|
| | Mead | | Appleton | | 3M | |
| Example | Bond Str. | Fan-Out Rating | Bond Str. | Fan-Out Rating | Bond Str. | Fan-Out Rating |
| 4 | 22 | 1.0 | 18 | 3.5 | 34 | 3.5 |
| 5 | 24 | 1.5 | 14 | 3.5 | 14 | 3.5 |
| 6 | 23 | 2.0 | 12 | 3.5 | 24 | 3.5 |
| 7 | 20 | 2.0 | 9 | 3.5 | 21 | 3.5 |
| 8 | 18 | 1.0 | 13 | 3.5 | 30 | 3.5 |
| 9 | 19 | 0.5 | 13 | 3.5 | 31 | 3.5 |
| 10 | 24 | 1.0 | 15 | 3.5 | 33 | 3.5 |
| 11 | 23 | 1.5 | 17 | 3.5 | 26 | 3.5 |
| 12 | 18 | 0.0 | 17 | 3.5 | 28 | 2.0 |

We claim:

1. Method of adhesively edge padding a stack of sets of collated sheets to permit the stack to be fanned apart into individual sets, at least one outer face of each set having a coating that serves as a release agent, said method comprising the steps of
  (1) applying to an edge of the stack a water-based adhesive composition which comprises by weight:
    (a) from 7.5 to 20 dry weight % of a water-based latex adhesive polymer,
    (b) from 2.5 to 12.5% of a noncrystallizing, low-molecular-weight, water-soluble polyhydric alcohol, and as little as 0.5% when the polyhydric alcohol is noncrystalline sorbitol,
    (c) from 12.5 to 27.5% of a low-molecular-weight, water-soluble, monohydric alcohol, and
    (d) from 40 to 75% of water, and
  (2) allowing the applied adhesive composition to dry.

2. Method as defined in claim 1 wherein said sheets are carbonless copy paper.

3. Method as defined in claim 1 wherein the water-based latex adhesive polymer comprises poly(ethylacrylate/N-methylolacrylamide).

4. Method as defined in claim 1 wherein the water-soluble monohydric alcohol comprises ethyl alcohol.

5. Method as defined in claim 1 wherein the water-soluble monohydric alcohol comprises isopropanol.

6. Method as defined in claim 1 wherein the noncrystallizing polyhydric alcohol comprises 1,2-propanediol.

7. Method as defined in claim 1 wherein the noncrystallizing polyhydric alcohol comprises noncrystalline sorbitol.

8. Method as defined in claim 7 wherein the noncrystallizing polyhydric alcohol is mostly noncrystalline sorbitol.

9. Method as defined in claim 8 wherein the noncrystallizing polyhydric alcohol is entirely noncrystalline sorbitol.

10. Method as defined in claim 1 and further comprising a step (3), fanning the stack into individual sets of the sheets.

11. A stack of sets of collated sheets that have been adhesively edge-padded by the method defined in claim 1.

12. A stack of sets of collated sheets as defined in claim 11 wherein said sheets are carbonless copy paper.

* * * * *